United States Patent [19]

Cummings

[11] Patent Number: 5,907,580
[45] Date of Patent: May 25, 1999

[54] METHOD AND APPARATUS FOR COMMUNICATING INFORMATION

[75] Inventor: Mark R. Cummings, Menlo Park, Calif.

[73] Assignee: Morphics Technology, Inc, Los Gatos, Calif.

[21] Appl. No.: 08/662,641

[22] Filed: Jun. 10, 1996

[51] Int. Cl.$^6$ ........................................................ H04L 5/16
[52] U.S. Cl. ........................................ 375/220; 455/88
[58] Field of Search .................................. 375/219, 220, 375/222, 316, 295; 455/73, 84, 88

[56] References Cited

U.S. PATENT DOCUMENTS

| | | | |
|---|---|---|---|
| 4,398,265 | 8/1983 | Puhl et al. | 455/73 |
| 4,912,756 | 3/1990 | Hop | 379/60 |
| 5,237,570 | 8/1993 | Smolinske et al. | 455/84 |
| 5,243,593 | 9/1993 | Timbs | 375/219 |
| 5,404,547 | 4/1995 | Diamantstein et al. | 455/84 |
| 5,444,869 | 8/1995 | Stricklin et al. | 455/88 |
| 5,566,205 | 10/1996 | Delfine | 375/219 |

*Primary Examiner*—Tesfaldet Bocure
*Attorney, Agent, or Firm*—Robert M. Storwick

[57] ABSTRACT

A method and apparatus for communicating information between a remote location and a user. Information from the remote location or the user is received by the inventive apparatus and processed by configurable circuitry to a form that can be received and used by the intended recipient. The reconfigurable circuitry can be changed manually by a human user or remotely through the receipt of appropriate signals. Accordingly, the apparatus can be reconfigured to be able to receive information that is transmitted in different forms from those forms that are receivable before reconfiguration.

14 Claims, 1 Drawing Sheet

METHOD AND APPARATUS FOR COMMUNICATING INFORMATION

DESCRIPTION

1. Technical Field

The present invention relates to methods and apparatus for communicating information, and more particularly, to methods and apparatus for adapting to changing communications services.

2. Background of the Invention

Personal communications is on the brink of an unprecedented expansion of its capabilities. With the advent of advanced personal communications services, such as cellular telephone and low earth orbit (LEO) satellite services, this expansion of capabilities benefits mobile users. Not only does the expansion of capabilities benefit voice communications, but it also benefits data communications, such as might be used with portable computers and other personal data communicators.

A major difficulty with the expansion of services is that a wide variety of different voice and data communications protocols have been proposed. It can be expected that this variety will increase, both world-wide and within a local area. For example, each communications service has its own technical, geographic and feature sets. Technical parameters include frequency(ies), modulation and protocol used, among others. Geographic parameters are dictated by the particular locale, such as footprint. Feature sets describe whether the service is voice, paging, data, or some combination of these.

As a consequence, a given communications device will become less useful as its user attempts to utilize it in areas that have incompatible services. For example, as people who rely on mobile communications move through a day, they can move in and out of different coverage areas and their communications needs will change constantly. Further, even within a local area, a given communications device will gradually become less useful as its built-in capabilities are rendered out-of-date by newer services.

It is clearly undesirable for the individual to have to carry a different communication device for each communication service. Also, few individuals really want to know the details and peculiarities of each of the available communication service. Most individuals would much rather have seamless service that is simple, convenient and cost-effective.

Therefore, it is advantageous to have a single personal communications device that will reconfigure itself to be compatible with whatever communication service is desired or needed. This is difficult with today's conventional technology.

Conventional technology solutions use a combination of digital signal processing (DSP) integrated circuits and application-specific integrated circuits (ASICs). The use of a DSP in mobile applications is limited by the requirement to run on small batteries. This limits the DSP to relatively slow clock rates. If the DSP clock rate is increased, the battery life decreases rapidly. For example, when taking into account memory access, a DSP performing on the order of one hundred operations per sample on a megahertz range signal can require a clock rate in the gigahertz range. This can consume all the power in small portable batteries in unacceptably brief times.

There are presently approximately two dozen non-compatible wireless communications services, and the number is currently increasing rapidly. There are also about twelve wired communications services, of which approximately eight are widely used today. The number of services, particularly wireless ones, will continue to increase over the next several decades because technology is evolving rapidly.

Conventional technology approaches use a combination of analog processing and ASICs to process these high frequency signals. These approaches work well for single service portable devices but do not perform well with multiple services, especially in portable units. When applied to multiple services, the conventional approach results in the use of multiple ASIC chip sets and analog subsystems. It quite often results in the use of multiple DSPs as well. The result of using conventional technology approaches is a large, heavy, expensive portable unit having short battery life and a range of supported services which is stagnant. In fixed units the problems of battery life are diminished, but the problems with stagnant service growth are magnified.

SUMMARY OF THE INVENTION

According to one aspect, the invention is an apparatus for providing communication between a user and a remote system. The system includes a communication circuit, a configurable circuit, and a control circuit. The communication circuit communicates with the remote system through transmittal of electromagnetic energy. The configurable circuit is connected to the communication circuit in order to communicate with the communication circuit using a remote system communication signal. The configurable circuit is further connectable to the user in order to communicate with the user using a user communication signal. The configurable circuit is configurable in response to a configuration signal. The control circuit produces the configuration signal and is connected to the configurable circuit in order to control the configurable circuit.

According to a second aspect, the invention is also a method for providing communication between a user and a remote system. The method includes the steps of a) providing a communication circuit to communicate with the remote system through transmittal of electromagnetic energy, and b) providing a configurable circuit in order to communicate with the communication circuit using a remote system communication signal. The configurable circuit is further connectable to the user in order to communicate with the user using a user communication signal. Also, the configurable circuit is configurable in response to a configuration signal.

Further the method includes the steps of: c) connecting the configurable circuit to the communication circuit; d) providing a control circuit to produce the configuration signal; and e) connecting the control circuit to the configurable circuit in order to control the configurable circuit.

According to a further aspect, the invention is an apparatus for providing communication between a user and a remote system. The apparatus includes communication means for communicating with the remote system through transmittal of electromagnetic energy. The apparatus also includes configurable circuit means connected to the communication circuit for communicating with the communication circuit using a remote system communication signal. The configurable circuit means is further connectable to the user for communicating with the user using a user communication signal. The configurable circuit means is configurable in response to a configuration signal. The apparatus further includes control circuit means for producing the configuration signal. The control circuit means is connected to the configurable circuit means in order to control the configurable circuit means.

DETAILED DESCRIPTION OF THE PREFERRED EMBODIMENT OF THE INVENTION

Figure 1:
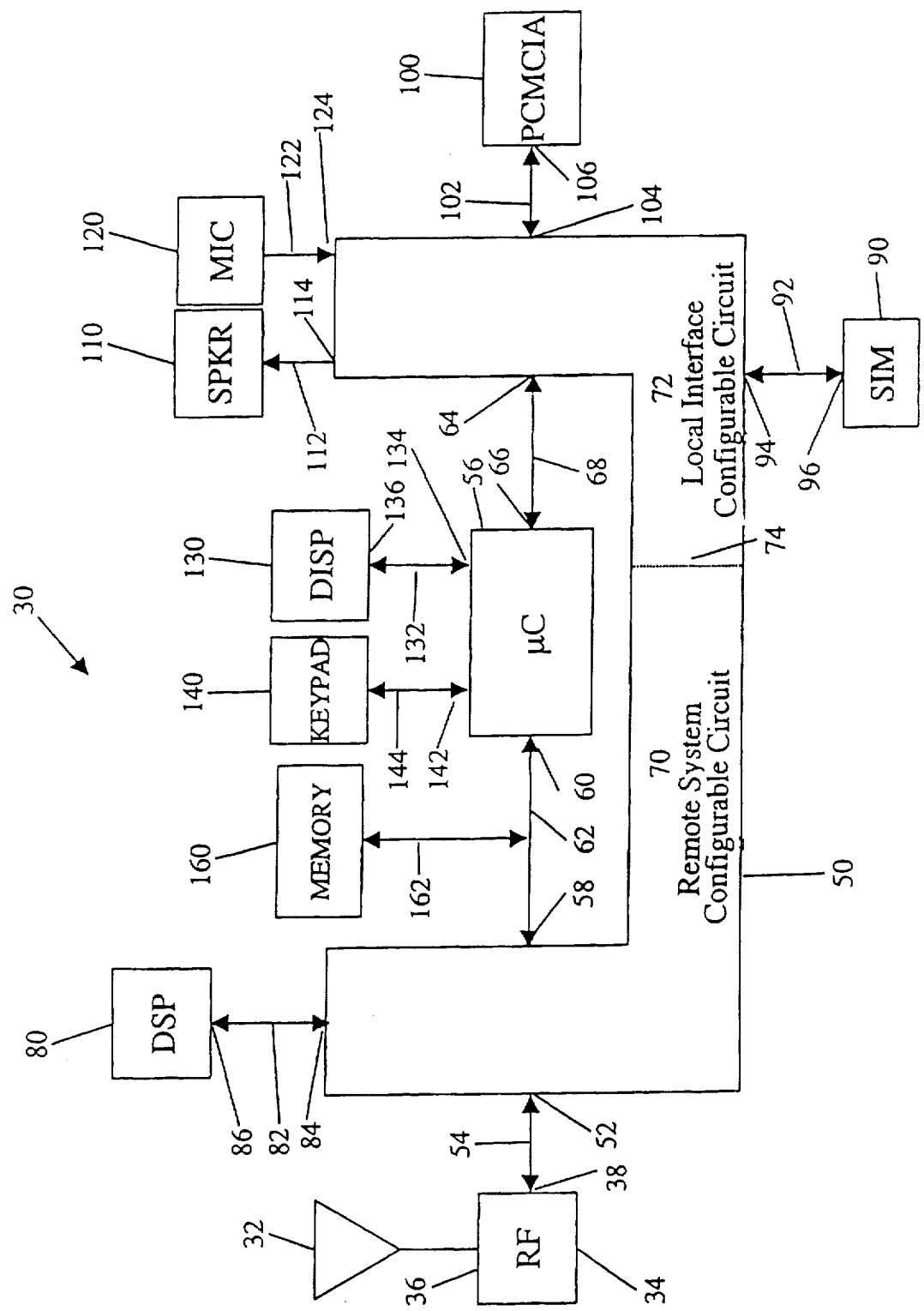
FIG. 1 is a schematic diagram of a preferred embodiment of the invention.

The approach to the problems described in the background of the invention is to use reconfigurable logic to create highly scalar, deeply pipelined, reconfigurable digital processing systems. This system runs at the data rate of the signal being processed, rather than a multiple of the signal rate, therefor consuming less power, being able to process higher frequency signals and higher performance. It can be reconfigured in milliseconds, therefore allowing it to support a wide variety of services. When combined with inexpensive microcontrollers and DSPs, such systems can eliminate the need for multiple ASIC chip sets and analog subsystems in order to support multiple services. This results in devices that can deliver system units which are small, lightweight, inexpensive, have long battery life, support multiple services and can have new capabilities added in the field. These new capabilities extend to entirely new services.

The situation for some wired services (for example, broadband CDMA) is the same as for wireless services. However, for other services the signal frequencies can be handled by conventional technology. Nonetheless, with the approach covered by this application, it is possible to support both multiple wired and wireless services at a much lower marginal cost than with conventional technology.

Both conventional technology and the technology covered by this invention rely on the same underlying chip fabrication processes, and improvements in the underlying processes will benefit both approaches equally. Therefore the relative advantage of the current inventive approach versus the conventional technology will continue over time.

FIG. 1 is a schematic diagram of a preferred embodiment of the invention. This structure can be implemented with a variety of physical processes including a printed circuit board, a multi-chip module and a single chip. The inventive communication circuit 30 has an antenna 32 which is connected to a radio frequency (RF) circuit 34 (also known as an RF "front-end" circuit) through an antenna port 36 of the RF circuit 34. The RF circuit 34 also has a bi-directional RF digital input port 38 that can be used to reconfigure it in a manner described subsequently. The antenna 32 is used to communicate with a remote system (not shown) for the purpose of providing communications between the remote system and a user of the inventive communication circuit 30. In some cases, the user can be a human who is communicating audibly with the remote system. In other cases, the user can be an electronic device that is communicating electronically with the remote system.

The RF circuit 34 is adapted to receive a digital control signal through the RF digital input port 38. In response to the digital control signal, the RF circuit 34 can operate in a receive mode or in a transmit mode. In the receive mode the RF circuit 34 can respond to electromagnetic waves which cause a response in the antenna 32, the response being converted to electrical signals through transductive action of the antenna 32. The electrical signals are received through the antenna port 36 in the RF circuit 34. In the transmit mode the RF circuit 34 responds to the digital signals passed through the RF digital input port 38. The RF circuit 34 then transduces the information contained in the electrical signals and produces electromagnetic energy that is passed to the antenna 32 through the antenna port 36.

The inventive communication circuit 30 also includes a configurable circuit 50 that communicates with the RF circuit 34 through a port 52 through a bi-directional line 54. The configurable circuit 50 can, for example, be made from one or more conventional field programmable gate arrays (FPGAs). The configurable circuit 50 is also connected to a microcontroller 56 in two places. A bi-directional port 58 of the configurable circuit 50 is connected to a bi-directional port 60 of the microcontroller 56 through a bi-directional line 62. Also, a bi-directional port 64 of the configurable circuit 50 is connected to a bi-directional port 66 of the microcontroller 56 through a bi-directional line 68.

The configurable circuit 50 can receive configuration signals from the microcontroller 56 through the bi-directional lines 62 and 68. The configuration signals cause the configurable circuit 50 to be partitioned into a remote system configurable circuit 70 and a local interface configurable circuit 72. The partition of the configurable circuit 50 into the remote system configurable circuit 70 and the local interface configurable circuit 72 is symbolized by the imaginary partition 74. The bi-directional port 58 of the configurable circuit 50 is always a part of the remote system configurable circuit 70 and the bi-directional port 64 of the configurable circuit 50 is always a part of the local interface configurable circuit 72, regardless of the way the configurable circuit 50 is partitioned. If desired, it can be advantageous to view the two partitions of the configurable circuit 50 to be separate from one another with a connection between the remote system configurable circuit 70 and the local interface configurable circuit 72.

The configurable circuit 50 is also connected to a digital signal processing (DSP) circuit 80 through a bi-directional line 82 which extends between a port 84 on the remote system configurable circuit 70 and a port 86 on the DSP 80. Although the DSP 80 is shown to be connected to the remote system configurable circuit 70 portion of the configurable circuit 50, it will be understood that the DSP circuit 80 could also be connected to the local interface configurable circuit 72.

The configurable circuit 50 is also connected to a security identification module (SIM) 90 (or other security or identification hardware required) through a bi-directional line 92 which extends between a port 94 on the local interface configurable circuit 72 and a port 96 on the SIM 90. The configurable circuit 50 performs the security and identification functions appropriate to the service or services being supported.

The local interface configurable circuit 72 is also connected to a local interface slot 100 (such as a PCMCIA slot) through a bi-directional line 102 which extends between a port 104 on the local interface configurable circuit 72 and a port 106 on the local interface slot 100.

The local interface configurable circuit 72 is also connected to a speaker 110 through a line 112 which extends between a port 114 on the local interface configurable circuit 72 and the speaker 110. Further, the local interface configurable circuit 72 is also connected to a microphone 120 through a line 122 which extends to a port 124 on the local interface configurable circuit 72.

The microcontroller 56, which may be a Hitachi H8-3002 microcontroller, is connected to a display 130, which may be a touch-input display device. The microcontroller 56 and the display 130 are connected through a bi-directional line 132 which extends between a port 134 on the microcontroller 56 and a port 136 on the display 130. A keypad 140 is also connected to a port 142 on the microcontroller 56 through a line 144.

Finally, a memory 160 is connected through a bi-directional line 162 to the port 58 on the remote system configurable circuit 70 and the port 60 on the microcontroller 56.

In use, the inventive communication circuit 30 is responsive to signals that program the microcontroller 56. The programming signals can be loaded into a program memory on the microcontroller 56 from the memory 160 through the lines 162 and 62 into the port 60. The microcontroller 56 is also responsive to commands and data entered through the keypad 140 and the line 144 into the port 142. The microcontroller 56 can also produce display signals, in response to inputs and its programming, to be displayed on the display 130 after passage through the line 132 from the port 134 to the port 136.

The microcontroller 56 is programmed to respond to various input signals by changing the configuration of the configurable circuit 50. For example, a portion of the configurable circuit 50 can be configured to respond in predetermined ways to signals received by the remote system configurable circuit 70, for example, by passing audible signals to the speaker 110. Simultaneously, a portion of the configurable circuit 50 can be configured to respond in predetermined ways to signals received by the local interface configurable circuit 72, for example, by causing the antenna 32 to transmit electromagnetic signals to the remote system. If desired the configurable circuit 50 can be configured to communicate with the DSP 80 for special purpose digital signal processing. Further, the configurable circuit 50 can be configured to communicate with the SIM 90 to provide additional security to communications through the inventive communication circuit 30.

The configuration of the configurable circuit 50 can easily be changed over time, as conditions change. For example, the inventive communication circuit 30 can pass from one geographic region to another. This may require the use of an additional communication service based on new modulation/demodulation techniques, protocols and possibly new transmit and receive frequencies. Upon receipt of appropriate reconfiguration signals, the microcontroller 56 will reconfigure the configurable circuit 50, load and/or activate programs in the DSP 130 and microcontroller 56 and, if necessary, reconfigure the RF circuit 34 through ways known to those skilled in the art. The microcontroller 56 may get the configuration and associated information (called TimeWare™) associated programs from memory or from the local interface slot 100 or from a remote system through the RF circuit 34.

While the foregoing is a detailed description of the preferred embodiment of the invention, there are many alternative embodiments of the invention that would occur to those skilled in the art and which are within the scope of the present invention. Included among those embodiments are those disclosed in United States patent applications filed concurrently with the present application, under Express Mail certificates EG952820632US and EG952820615US. Accordingly, the present invention is to be determined by the following claims.

I claim:

1. An apparatus for providing communication between a user and a remote system, comprising:

a communication circuit to communicate with the remote system through transmittal of electromagnetic energy;

a configurable circuit connected to the communication circuit in order to communicate with the communication circuit using a remote system communication signal and the configurable circuit further being connectable to the user in order to communicate with the user using a user communication signal, the configurable circuit being configurable in response to a configuration signal; and a control circuit to produce the configuration signal and being connected to the configurable circuit in order to control the configurable circuit.

2. The apparatus of claim 1, wherein the configurable circuit includes a remote system configurable circuit and a local interface configurable circuit, the remote system configurable circuit being connected to the communication circuit and the local interface configurable circuit.

3. The apparatus of claim 2, wherein the configurable circuit includes a reconfigurable logic device, such as a field programmable gate array.

4. The apparatus of claim 3, wherein the field programmable gate array is partitioned into the remote system configurable circuit and the local interface configurable circuit, the partition being determined by the configuration signal.

5. The apparatus of claim 4, wherein the partition is a function of time.

6. A method for providing communication between a user and a remote system, comprising the steps of:

a) providing a communication circuit to communicate with the remote system through transmittal of electromagnetic energy;

b) providing a configurable circuit in order to communicate with the communication circuit using a remote system communication signal and the configurable circuit further being connectable to the user in order to communicate with the user using a user communication signal, the configurable circuit being configurable in response to a configuration signal;

c) connecting the configurable circuit to the communication circuit;

d) providing a control circuit to produce the configuration signal; and e) connecting the control circuit to the configurable circuit in order to control the configurable circuit.

7. The method of claim 6, wherein the configurable circuit includes a reconfigurable logic device, such as a field programmable gate array.

8. The method of claim 6, further including the step of:

f) partitioning the field programmable gate array into a remote system configurable circuit and a local interface configurable circuit, the partition being determined by the configuration signal.

9. The method of claim 8, wherein step f) is a function of time.

10. An apparatus for providing communication between a user and a remote system, comprising:

communication means for communicating with the remote system through transmittal of electromagnetic energy;

configurable circuit means connected to the communication circuit for communicating with the communication circuit using a remote system communication signal and the configurable circuit means further being connectable to the user for communicating with the user using a user communication signal, the configurable circuit means being configurable in response to a configuration signal; and control circuit means for producing the configuration signal, the control circuit means being connected to the configurable circuit means in order to control the configurable circuit means.

11. The apparatus of claim 10, wherein the configurable circuit means includes a remote system configurable circuit means and a local interface configurable circuit means, the remote system configurable circuit being connected to the communication circuit means and a local interface configurable circuit.

12. The apparatus of claim 11, wherein the configurable circuit means includes a reconfigurable logic device, such as a field programmable gate array.

13. The apparatus of claim 12, wherein the field programmable gate array is partitioned into the remote system configurable circuit means and the local interface configurable circuit means, the partition being determined by the configuration signal.

14. The apparatus of claim 13, wherein the partition is a function of time.

* * * * *